United States Patent
Cluyse

(12) 
(10) Patent No.: US 6,391,207 B1
(45) Date of Patent: May 21, 2002

(54) TREATMENT OF SCALE

(75) Inventor: Jean Achille Emile Robert Cluyse, Ottignies-LLN (BE)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 0 days.

(21) Appl. No.: 09/515,729

(22) Filed: Feb. 29, 2000

(51) Int. Cl.$^7$ .................................................. C02F 7/00
(52) U.S. Cl. ....................... 210/700; 210/699; 210/701; 252/180
(58) Field of Search ................................ 210/698–701, 210/631; 252/180

(56) References Cited

U.S. PATENT DOCUMENTS

| | | | |
|---|---|---|---|
| 4,503,172 A | 3/1985 | Farrar et al. | 523/336 |
| 4,506,062 A | 3/1985 | Flesher et al. | 526/211 |
| 4,528,321 A | 7/1985 | Allen et al. | 524/761 |
| 4,599,379 A | 7/1986 | Flesher et al. | 524/801 |
| 4,900,451 A | 2/1990 | Brown et al. | 210/699 |
| 5,087,376 A * | 2/1992 | Bendiksen | 210/700 |
| 5,352,365 A * | 10/1994 | Fuller | 210/699 |
| 5,454,954 A | 10/1995 | Alfano et al. | 210/700 |
| 5,593,595 A * | 1/1997 | Gill | 210/700 |
| 5,798,043 A * | 8/1998 | Khudenko | 210/603 |
| 6,063,289 A | 5/2000 | Failon et al. | 210/699 |

FOREIGN PATENT DOCUMENTS

| | | |
|---|---|---|
| EP | 0 185 458 | 6/1986 |

OTHER PUBLICATIONS abstract pages of EP 0 129,329; EPO 127 388; EP 0 126 528; EP 0 150 933 and EP 0 102 760.
Nick Booker CSIRO, "Struvite formation in waste water treatment plants: an accident waiting to happen".
Abstract of JP8099091A2 (1996).

\* cited by examiner

*Primary Examiner*—Peter A. Hruskoci
(74) *Attorney, Agent, or Firm*—David R. Crichton

(57) ABSTRACT

A method for reducing or preventing the formation of scale in a municipal or industrial waste water treatment facility comprising introducing an antiscalent composition which comprises:

A) A water soluble polymer of molecular weight below 20,000 and containing anionic groups, and B) A sequesterant compound, selected from the group consisting of phosphonates, phosphates, metaphosphates and orthophosphates including derivatives and salts thereof. Preferred antiscalent compositions include a blend of A) a polymer of acrylic acid and/or maleic acid and B) diethylentriamine penta (methylenephosphonic acid) or salts thereof. The invention is of particular value for the treatment of struvite scale in sewage treatment works.

6 Claims, No Drawings

TREATMENT OF SCALE

TREATMENT OF SCALE

The present invention relates to a novel method of treatment for the prevention, reduction of removal of scale in municipal and industrial waste water treatment facilities. The invention employs a new anti-scaling composition which is especially useful for the treatment of waste treatment plants prone to struvite scaling.

The precipitation of struvite is a recurring problem, especially in anaerobic sludge digestion systems. Soluble magnesium combines with ammonia and phosphate, released during the aerobic digestion to form magnesium ammonium phosphate ($MgNH_4PO_4.6H_2O$) which is frequently referred to as struvite. Struvite is a hard, tenacious solid that is extremely difficult to remove from equipment surfaces and pipelines. It is generally encountered in sludge lines and downstream processes following biological phosphate removal and subsequent anaerobic digestion, although it can form wherever the solubility limit is exceeded. This can also be related to pH changes caused by sludge degassing. Deposits tend to form in pipes where waste waters stand between intermittent flows, but also in areas where there is turbulent flow, pressure change or where cavitation occurs. Thus struvite deposition occurs most frequently in pipes, pipe elbows, valves, centrifuge weir overflows, pumps etc.

Struvite deposition is becoming an increasingly widespread problem for a great many waste water treatment plants, since it reduces throughputs, which could adversely affect subsequent sludge processing. In extreme cases the struvite can reduce the throughput so significantly that the plant operation has to be stopped and then the blocked pipework and other equipment must be cleaned. Generally struvite deposits can only be removed completely by treatment with acid. This can be expensive and involve potentially dangerous handling and disposal of cleaning products (acidic solutions) which can also cause excessive wear to the equipment. In addition the plant closure time during the cleaning operation can also be costly.

Various proposals have been made in order to deal with this problem, many with some degree of success, but none of them have successfully overcome this problem completely.

For instance it is known to attempt to control the release of phosphate biologically. In an article by Nic Booker CSIRO, Molecular Science, entitled, "Struvite formation in wastewater treatments plants: an accident waiting to happen?", the issue of nutrient removal from wastewater discharges is discussed. The study claims that Biological phosphorus removal plants can reduce phosphorus concentrations to less than 1 mg/L. However there is a tendency for some plants with insufficient ready assimilable carbon in the feedwater to have difficulty in consistently achieving this level. In addition the biological phosphorus plants involve a number of different stages of treatment, including anaerobic, aerobic and anoxic zones and require long liquid residence times of around 24 hours.

There have also been suggestions to prevent struvite formation by removing ammonia and phosphate chemically by the addition of magnesium to raise the pH. However, in practice this was found to be unsuccessful on the whole.

Another proposal has been to add 20 mg/L ferric salts and 0.25 mg/L anionic polymer. However, the addition of such large amounts of ferric salt could have a detrimental effect on the plant equipment.

In JP-A-08-099091 it is proposed to prevent the generation of struvite scale in piping by chemical reaction/crystallisation employing special separation equipment to recover the crystals of struvite. However, installing such struvite precipitating equipment adds an additional burden to the operation of the waste water treatment plant.

There has also been a proposal to combine a sequesterant with a polymeric dispersant. However, to our knowledge we are not aware of the commercial success of such a system.

Thus there exists a need to simply and conveniently prevent or significantly reduce the formation of struvite in waste water treatment facilities. Furthermore there is also a need to find a simple and convenient treatment of aqueous systems containing struvite deposits.

Thus according the present invention we provide a method for reducing or preventing the formation of scale in a municipal or industrial waste water treatment facility comprising introducing an antiscalent composition which comprises:

A) A water soluble polymer of molecular weight below 20,000 and containing anionic groups, and B) A sequesterant compound containing at least one phosphonate group and salts thereof.

We have found that the special combination of low molecular weight anionic water soluble polymer and phosphate sequesterant give surprisingly effective results in reducing or preventing scale, especially struvite in waste water treatment systems. Thus it is essential to the present invention that the sequesterant comprised in the antiscalent composition of the present invention is a compound containing at least one phosphonate group.

The antiscalent composition may be used for the treatment of any scale deposits in a water treatment facility. The method is of particular relevance when the scale deposits comprise crystalline precipitate formed by the combination of phosphate, ammonia and magnesium, which may exist as magnesium ammonium phosphate ($MgNH_4PO_4.6H_2O$) which is generally referred to as struvite.

The method may be applied to any waste water treatment facility in which scale deposit are a particular problem, especially where the scale deposit is struvite. We have found the method is especially valuable in removing, reducing or preventing scale deposition in sewage treatment plants. Hence in a particularly preferred form of the invention we provide a method in which struvite deposition is removed, reduced or prevented in a sewage treatment plant employing as a treatment aid the aforementioned antiscalent composition.

A further aspect of the invention relates to the treatment of any aqueous system containing struvite deposit. Thus we provide the use of a composition comprising A) A water soluble polymer of molecular weight below 20,000 and containing anionic groups, and B) A sequesterant compound containing at least one phosphonate group and salts thereof, for the treatment of aqueous systems containing struvite.

The antiscalent composition employed in the present invention preferably comprises 25 to 75% by weight of the water soluble polymer (component A) and 25 to 75% by weight of the sequesterant (component B). Generally we have found that for many treatments it is preferred that the antiscaling composition comprises 30 to 70% by weight, most preferably 40 to 60%, of the water soluble polymer and between 30 and 70% by weight, most preferably 40 to 60%, of the sequesterant.

The water soluble polymer component of the antiscalent composition comprises anionic groups. The polymer is desirably formed from ethylenically unsaturated anionic monomer or anionic monomer blend in which the monomer blend comprises at least one of the anionic monomer. Typically the anionic monomer or anionic monomer blend can be formed from at least one ethylenically unsaturated carboxylic acid, sulphonic acid or phosphonic acid monomer. The monomers include acrylic acid, methacrylic acid, maleic acid, maleic anhydride, fumaric acid, itaconic acid, crotonic acid, vinyl phosphonic acid, vinyl sulphonic acid, allyl sulphonic acid, 2-acrylamido-2-methylpropanesulphonic acid. When more than one monomer is employed in a blend, the monomer blend may comprise any of the aforementioned anionic monomer or alternatively a suitable ethylenically unsaturated nonionic monomer, for instance acrylamide or methacrylamide. The polymers may exist in the free acid form or more preferably they are partially or fully neutralised. A particularly preferred water soluble polymer is the homopolymer of acrylic acid, homopolymer of maleic acid, hompolymer maleic anhydride or a copolymer of acrylic acid with either maleic acid or maleic anhydride.

Typically the water soluble polymer is polymerised to a relatively low molecular weight. By low molecular weight we mean that the polymer will have a molecular weight as determined by GPC of below 20,000. However, the molecular weight of the polymer may desirably be in the range 1,500 to 10,000, preferably 2,000 to 5,000.

One way of preparing the water soluble polymer is by solution polymerisation of an aqueous solution of the monomers. Generally the aqueous monomer solution should be between 20 to 40% concentration, preferably around 30 to 35%. The monomer solution may also include a chain transfer agent, for instance sodium hypophosphite, 2-mercaptoethanol or isopropanol. If sodium hypophosphite is used as the chain transfer agent, the amount can be as much as 2000 ppm by weight, but is preferably in the range 10 to 500 ppm by weight, particularly 10 to 50 ppm. Where isopropanol is used as the chain transfer agent it is usual to use this as a part of the solvent system. Thus the monomers would be mixed with an isopropanol/water mixture and then polymerised.

A suitable initiator system, for instance aqueous ammonium persulphate, sodium metabisulphite or tertiary butyl hydroperoxide, optionally with other initiators is introduced. When preparing gel polymers by solution polymerisation the initiators are generally introduced into the monomer solution. Optionally a thermal initiator system may be included. Typically a thermal initiator would include any suitable initiator compound that releases radicals at an elevated temperature, for instance azo compounds, such as azobisisobutyronitrile. The temperature during polymerisation should rise to at least 70° C. but preferably below 95° C. Depending upon the molecular weight and the concentration of polymer in solution the formed polymer may be a sightly viscous but pourable aqueous solution or could be a rigid gel. Polymer gels may be further processed in a standard way by first comminuting the gel into smaller pieces, drying to the substantially dehydrated polymer followed by grinding to a powder. Pourable solutions of the polymer do not need further processing and would normally be supplied in this form where they may be further diluted on application.

Alternatively the polymers are produced as beads by suspension polymerisation or as a water-in-oil emulsion or dispersion by water-in-oil emulsion polymerisation, for example according to a process defined by EP-A-150933, EP-A-102760 or EP-A-126528.

Although to the invention in some instances beneficial results may be obtained when the polymer has a narrow polydispersity. Thus such polymers would contain a narrow molecular weight distribution. Typically such polymers may have a polydispersity of below 1.5. They may be prepared in accordance with the teachings of EP-A-127388, EP-A-129329 and EP-A-185458.

According to the invention the antiscalent composition comprises as component B a sequesterant compound containing at least one phosphonate group and salts thereof. The invention embraces any phosphonate sequesterant compound that in combination with the water soluble anionic polymer of component A produces a beneficial effect in the removal, reduction and prevention of scale deposits, especially struvite. Preferably the phosphonate sequesterant comprises at least two phosphonate groups which at least one nitrogen atom. Desirably the phosphonate sequesterant can be desirably a compound of the formula I

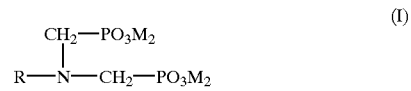

wherein M is hydrogen, alkali metal or ammonium and R is selected from the group consisting of —H, —CH$_2$CH$_2$N(CH$_2$ PO$_3$M$_2$)$_2$. —N(CH$_2$ PO$_3$M$_2$)CH$_2$CH$_2$N(CH$_2$ PO$_3$M$_2$)$_2$ and —(CH$_2$)$_6$N(CH$_2$ PO$_3$M$_2$)$_2$. A particularly preferred sequesterant is the compound of formula II,

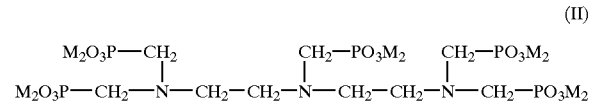

known as diethylenetriamine penta (methylene phosphonic acid) and including the corresponding alkali metal or ammonium salts, most preferred are the sodium salts.

The phosphonate sequesterant may be any one of a number of commercially available sequesterant products, for example Dequest$^{RTM}$ 2066 which is a post acidified sodium salt of diethylenetriamine penta (methylene phosphonic acid) available from Solutia.

The antiscalent composition is generally prepared by missing an aqueous solution of the anionic water soluble polymer component with an aqueous solution of the phosphonate sequesterant.

The antiscalent composition may be applied at any point in the waste water treatment process. Desirably though it may be applied more effectively shortly before where the scale or struvite deposits have formed or are prone to form. Struvite tends to form in pipes where waste waters stand between intermittent flows, or in areas of turbulent flow, for instance where a pressure change or cavitation occurs. Thus since struvite deposition occurs most frequently in pipes, pipe elbows, valves, centrifuge weir overflows, pumps etc., it may be desirable to dose at or prior to these points. For instance it may be preferred to apply the antiscalent composition up to 200 meters prior to the area where scaling occurs. Thus it may be preferred to add the antiscalent such that it will thoroughly mix into the substrate before reaching the point where scaling occurs.

The antiscalent composition may be added in any amount, for instance up to 100 ppm. This dose is based on active sequesterant/polymer content per volume of waste water/substrate to be treated i.e. mg active antiscalent composition per liter of waste water. Generally though effective scale prevention/reduction may be achieved with much smaller doses, for instance 5 to 10 ppm, but may be as low as 2 or 3 ppm. We have found that scale/struvite can be effectively reduced or removed by an initial treatment of the antiscalent composition, for instance in the range 10 to 60 ppm, more preferably in the range 20 to 40 ppm. Following this initial treatment we have surprisingly found that sustained scale/struvite prevention can be achieved using reduced doses of the antiscalent composition, for instance between 5 or 10 ppm lower than the initial dose.

The following examples illustrate the invention.

EXAMPLE 1

A plant trial was carried out at a waste water treatment plant which had been suffering from struvite deposition. The sewage treatment plant has a primary treatment stage which comprises a moving bed biofilm process bilogical reactors. In addition there is a pre-screening and pumping of the primary sewage. The secondary treatment stage includes intermediate contact/settlement and fine bubble aeration (conventional activated sludge). The primary sewage sludge and secondary activated sludge are anaerobically digested prior to centrifuge dewatering and pelletising in a drier. The plant was experiencing struvite build-up in the centrate discharge lines.

An antiscalent composition comprising A) 48% w/w sodium salt of a sodium polyacrylate of molecular weight 4,500 to 5,000 (measured by GPC) aqueous solution as a 40 weight % active polymer content and B) 52% sodium salt of diethylenetriaminpenta (methylenephosphonic acid) provided as a 45 to 49% post acidified aqueous solution.

The antiscalent composition is dosed at 30 mg/l (based on active antiscalent per liter of substrate) after the common sludge feed approximately 100 meters before the centrifuge.

The treatment showed that struvite deposition was reduced from about 330 mg/m$^3$ to 160 mg/m$^3$ sludge flow.

EXAMPLE 2

A plant trial was carried out at a waste water treatment plant which had been suffering from struvite deposition. The preliminary and primary treatment of the wastewater is treated in non-nitrifying activated sludge plant then in nitrifying trickling filters. The secondary activated sludge is cosettled in primary tanks then anaerobically digested and dewatered in a centrifuge.

A Bardenpho plant is installed to treat part of the flow with an anaerobic/aerobic sequence to facilitate phosphorus uptake and an anoxic/aerobic recycle sequence to remove ammonical nitrogen and prevent struvite precipitation. However, the plant does experience struvite precipitation in the digested sludge pipelines.

The antiscalent composition of Example 1 is dosed to the digested sludge pipelines at a dose of 40 mg/l, with the result of preventing struvite precipitation.

What is claimed is:

1. A method for reducing or preventing the formation of scale or removal of scale including struvite in a municipal or industrial waste water treatment facility comprising introducing an effective amount of an antiscalent composition that removes struvite scale which comprises:
    A) a water soluble polymer of molecular weight below 20,000 and containing anionic groups, and
    B) a sequesterant compound containing at least one phosphonate group and salts thereof, wherein component (A) is a partially or fully neutralized homopolymer of acrylic acid, wherein the antiscalant composition comprises 25 to 75% by weight of component A and 25 to 75% by weight of component B.

2. A method according to claim 1 in which the waste water treatment facility is a sewage treatment plant.

3. A method according to claim 1 in which the polymer has a molecular weight in the range of 1,500 to 10,000.

4. A method according to claim 1 in which component B is a compound according to formula I

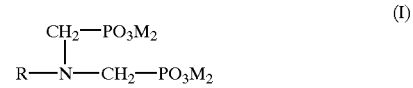

wherein M is hydrogen, alkali metal or ammonium and R is selected from the group consisting of —H, —CH$_2$CH$_2$N(CH$_2$ PO$_3$M$_2$)$_2$—N(CH$_2$ PO$_3$M$_2$)CH$_2$CH$_2$N(CH$_2$PO$_3$M$_2$)$_2$ and —(CH$_2$)$_6$N(CH$_2$ PO$_3$M$_2$)$_2$.

5. A method according to claim 1 in which component B is a compound according to formula II

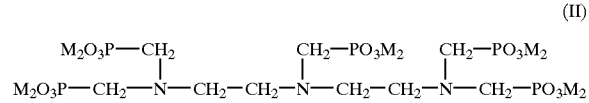

wherein M is selected from H, alkali metal and ammonium.

6. A method according to claim 1 in which the polymer has a molecular weight in the range of 2,000 to 5,000.

* * * * *